United States Patent [19]
Ashinuma et al.

[11] Patent Number: 6,084,830
[45] Date of Patent: *Jul. 4, 2000

[54] SIGNAL REPRODUCING APPARATUS FOR REPRODUCING INFORMATION BY MOVING MAGNETIC WALLS

[75] Inventors: Takaaki Ashinuma, Yokohama; Tsutomu Shiratori, Tokyo, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/931,362

[22] Filed: Sep. 16, 1997

[30] Foreign Application Priority Data

Sep. 19, 1996 [JP] Japan .................................. 8-247708

[51] Int. Cl.⁷ .................................................. G11B 11/00
[52] U.S. Cl. .............................................. 369/13; 369/116
[58] Field of Search .............................. 369/13, 116, 14, 369/110, 59; 360/59, 114; 365/122

[56] References Cited

U.S. PATENT DOCUMENTS

| | | | |
|---|---|---|---|
| 5,380,573 | 1/1995 | Fukumoto et al. | 428/64 |
| 5,384,758 | 1/1995 | Matsumoto | 369/13 |
| 5,390,162 | 2/1995 | Fukumoto et al. | 369/116 |
| 5,432,774 | 7/1995 | Fukumoto et al. | 369/275.4 |
| 5,532,984 | 7/1996 | Matsumoto et al. | 369/13 |
| 5,719,829 | 2/1998 | Nishimura | 369/13 |
| 5,740,133 | 4/1998 | Tamanoi et al. | 369/13 |

FOREIGN PATENT DOCUMENTS 6-290496  10/1994  Japan .

*Primary Examiner*—Tan Dinh
*Attorney, Agent, or Firm*—Fitzpatrick, Cella, Harper & Scinto

[57] ABSTRACT

A micro mark on a magnetic recording medium is reproduced in a signal reproducing apparatus by causing a magnetic wall to move on the recording medium. A partial temperature profile is applied on the medium by a heating device which is adapted to be movable relative to the medium. A reproducing device generates a first reproduction signal containing a signal component due to a first magnetic wall movement from a front side of a temperature peak position in the temperature profile toward the temperature peak position and a signal component due to a second magnetic wall movement from a rear side of the temperature peak position toward the temperature peak position. The signal component due to the second magnetic wall movement is reduced in the reproduction signal so as to generate a second reproduction signal which mainly contains the signal component due to the first magnetic wall movement.

16 Claims, 7 Drawing Sheets and, more particularly, to a signal
reproducing apparatus for reproducing information recorded
with a pit length smaller than an optical diffraction limit.

SIGNAL REPRODUCING APPARATUS FOR REPRODUCING INFORMATION BY MOVING MAGNETIC WALLS

BACKGROUND OF THE INVENTION

1. Field of the Invention

The present invention relates to a signal reproducing apparatus including a magneto-optical disk drive for recording and/or reproducing information with laser light by using a magneto-optical effect and, more particularly, to a signal reproducing apparatus for reproducing information recorded with a pit length smaller than an optical diffraction limit.

2. Related Background Art

Recently, research is being extensively done to increase the storage capacity of an optical disk as a storage medium, CD-ROMs and DVDs have become commercially available, and writing once and rewritable optical disks are gradually being put into practical use. Also, various recording and reproducing methods for these recording media have been proposed. Examples are laser pulse magnetic field modulation, a magnetic super resolution technique, an optical super resolution technique, and a phase change optical disk method.

Of means for improving the linear recording density of an optical disk, Japanese Patent Application Laid-Open No. 6-290496 has disclosed a magneto-optical recording medium, a reproducing method, and a reproducing apparatus as a recording medium in which a signal is recorded with a pit length smaller than an optical diffraction limit and means for reproducing the signal. This reproducing method uses a magneto-optical recording medium formed by sequentially stacking at least first, second, and third magnetic layers. The first magnetic layer is made of a perpendicular magnetization film having a smaller magnetic wall coercivity and a larger magnetic wall mobility than those of the third magnetic layer at a temperature near the ambient temperature. The second magnetic layer has a Curie temperature lower than those of the first and third magnetic layers. The third magnetic layer is a perpendicular magnetization film. A light beam is irradiated from the side of the first magnetic layer while being moved relative to the medium, thereby forming a temperature profile having a gradient with respect to the moving direction of the spot of the light beam on the medium. This temperature profile is made to have a region at a temperature higher than at least the Curie temperature of the second magnetic layer. Consequently, magnetic walls formed in the first magnetic layer are moved, and a change in the plane of polarization of the reflected light of the light beam is detected. In this manner, recorded information is reproduced.

Another reproducing method using a medium including a fourth layer in addition to the above three layers is also proposed. This fourth layer is formed between the first and second magnetic layers and has a Curie temperature higher than that of the second magnetic layer and lower than that of the first magnetic layer. The fourth layer is made of a perpendicular magnetization film having a smaller magnetic wall coercivity than that of the third magnetic layer at a temperature higher than at least the Curie temperature of the second magnetic layer. A light beam is irradiated from the side of the first magnetic layer while being moved relative to the medium, thereby forming a temperature profile having a gradient with respect to the moving direction of the spot of the light beam on the medium. This temperature profile is made to have a region at a temperature higher than at least the Curie temperature of the second magnetic layer and close to the Curie temperature of the fourth magnetic layer. Consequently, magnetic walls formed in the first and fourth magnetic layers are moved and a change in the plane of polarization of the reflected light of the light beam is detected. In this manner, recorded information is reproduced. This recording medium and the basic operating principle of the reproducing method using the medium are described in Japanese Patent Application Laid-Open No. 6-290496.

In the above reproducing method, however, it is necessary to raise the temperature from the front of the light beam spot to form a temperature profile having a peak after the spot. That is, as described in the above reference, a means for forming such a temperature profile can be realized by using a heating light source (laser) having a wavelength different from the wavelength of a reproducing beam and irradiating this heating light beam having a larger beam diameter than that of the reproducing beam. In this system, optical parts such as a dichroic mirror for focusing the heating beam on a medium are necessary in addition to the heating beam light source. When the number of steps of aligning the individual light beams are taken into consideration, the apparatus is much more expensive than a common magneto-optical disk head. The size of the apparatus is also increased.

On the other hand, if reproduction is performed with a temperature gradient formed by a normal reproducing beam without using any heating beam, the position of a peak temperature is present in the reproducing beam spot as shown in FIG. 2(b). Accordingly, magnetic walls move into the reproducing spot from isothermal lines formed before and after the reproducing spot. A detailed description of this magnetic wall movement will be omitted. Details of the magnetic wall movement are described in Japanese Patent Application Laid-Open No. 6-290496.

If this is the case, as shown in FIG. 3(a) through 3(c), signals due to movements of forward and backward magnetic walls along the moving direction of the reproducing spot are detected in a region irradiated with a single beam. As shown in FIG. 3(m), the reproduction signal is a synthetic signal of signals having the same waveform, a fixed time difference, and different amplitudes.

In this state, therefore, a noise component (a signal shifted in time) is added to a necessary information signal. This makes accurate reproduction of the information impossible.

SUMMARY OF THE INVENTION

The present invention has been made to solve the above conventional problems, and has as its object to provide a small-sized, low-cost signal reproducing apparatus capable of reproducing a recorded signal having a recording mark with a pit length smaller than an optical diffraction limit and obtaining accurate reproduction information although the reproduction is performed by using only a reproducing beam without using any heating beam as described above.

The above object of the present invention is achieved by a signal reproducing apparatus for reproducing a fine mark by moving a magnetic wall on a magnetic recording medium, comprising:

heating means for applying a partial temperature profile on the medium, the heating means moving relative to the medium;

reproducing means for generating a first reproduction signal containing both a signal component generated by a first magnetic wall movement from a front side of a temperature peak position in the temperature profile toward the temperature peak position and a signal component generated by a second magnetic wall movement from a back side of the temperature peak position toward the temperature peak position, the reproducing means moving relative to the medium; and calculating means for reducing the signal component generated by the second magnetic wall movement in the reproduction signal and generating a second reproduction signal primarily containing the signal component generated by the first magnetic wall movement by an arithmetic operation.

Other features and advantages of the invention will become apparent from the following detailed description taken in conjunction with the accompanying drawings.

DETAILED DESCRIPTION OF THE PREFERRED EMBODIMENT

Figure 1:
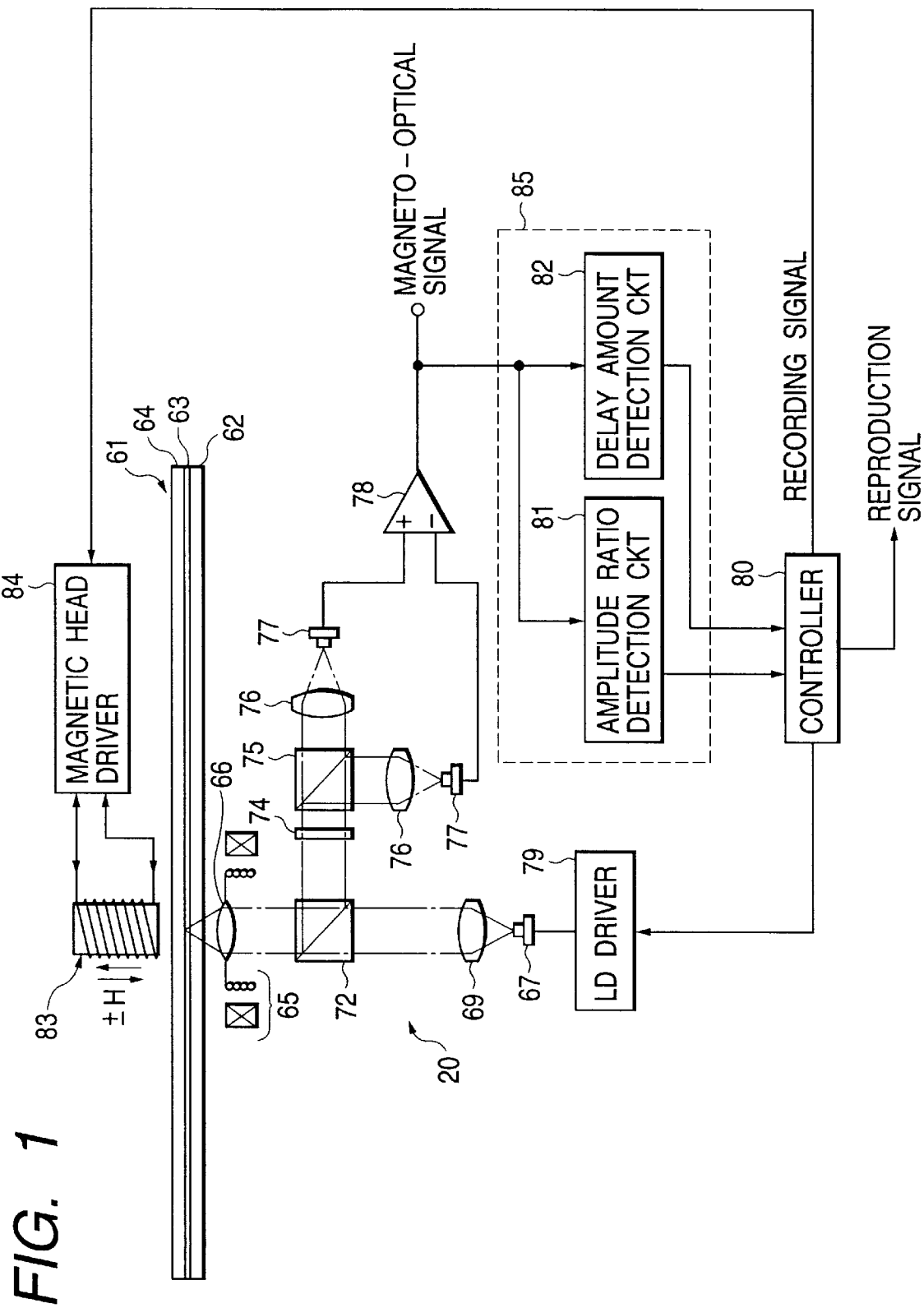
FIG. 1 is a block diagram showing the outline of a signal reproducing system using a reproducing laser according to the present invention.

FIG. 1 shows the arrangement of a magneto-optical recording/reproducing apparatus according to the first embodiment of the present invention. Referring to FIG. 1, a magneto-optical disk 61 includes a substrate 62 made from glass or plastic, a magneto-optical recording medium 63 adhered to the substrate 62, and a protective layer 64 formed on the magneto-optical recording medium 63. In the magneto-optical recording medium 63, magnetic walls of a recording mark in a reproduction layer can move, without changing recorded data in a recording layer, by using the temperature gradient of a magnetic domain with respect to the temperature of the recording medium caused by irradiation of a light beam, the magnetic domain within a reproducing spot being enlarged to detect a change in the plane of polarization of the reflected light of the light beam so as to reproduce the recording mark. The magneto-optical disk 61 is supported by a spindle motor by means of, e.g., magnet chucking (not shown) and can be rotated around a rotating shaft.

Elements 65 to 67, 69, 72, and 74 to 77 are parts constituting an optical head for irradiating laser light onto the magneto-optical disk 61 and obtaining information from the reflected light. The element 66 is a condenser lens, and the element 65 is an actuator for driving the condenser lens 66. The element 67 is a semiconductor laser, the element 69 is a collimator lens, the element 72 is a beam splitter, the element 74 is a $\lambda/2$ plate, and the element 75 is a polarizing beam splitter. The elements 77 are photosensors, and the elements 76 are condenser lenses for the photosensors 77. A differential amplifier 78 differentially amplifies signals focused and detected in accordance with the polarization directions.

In the magneto-optical recording/reproducing apparatus with the above arrangement, a laser beam emitted from the semiconductor laser 67 is irradiated on the magneto-optical disk 61 via the collimator lens 69, the beam splitter 72, and the condenser lens 66. The condenser lens 66 is so controlled by the actuator 65 as to move in a focusing direction and a tracking direction to sequentially focus the laser beam on the magneto-optical recording medium 63. The condenser lens 66 also traces along guide grooves formed on the magneto-optical disk 61. The optical path of the laser beam reflected by the magneto-optical disk 61 is changed toward the direction of the polarizing beam splitter 75 by the beam splitter 72. The light beam is condensed to the photosensors 77 by the condenser lenses 76, in accordance with the polarity of magnetization of the magneto-optical recording medium, via the $\lambda/2$ plate 74 and the polarizing beam splitter 75. The differential amplifier 78 differentially amplifies the outputs from the photosensors 77 and outputs a magneto-optical signal. A controller 80 inputs a recording signal to be recorded and also receives, e.g., the rotational speed, recording radius, and recording sector of the magneto-optical disk 61 as input information and outputs the recording power of the semiconductor laser 67 and the recording signal, thereby controlling an LD driver 79 and a magnetic head driver 84. The LD driver 79 drives the semiconductor laser 67 and controls a desired recording power and reproducing power in this embodiment.

A magnetic head 83 applies a modulated magnetic field to a laser irradiated portion of the magneto-optical disk 61 during recording. The magnetic head 83 is arranged to oppose the condenser lens 66 with the magneto-optical disk 61 interposed between them. In recording, the recording/reproducing semiconductor laser 67 is driven by the LD driver 79 to irradiate the recording laser power by DC light. At the same time, the magnetic head 83 is driven by the magnetic head driver 84 to generate a magnetic field having a different polarity in accordance with a recording signal. Also, this magnetic head 83 moves in the radial direction of the magneto-optical disk 61 in synchronism with the optical head. In recording, the magnetic head 83 sequentially applies a magnetic field to laser irradiated portions of the magneto-optical recording medium 63, thereby recording information.

The output from the differential amplifier 78 is applied to a signal processing circuit 85. A magneto-optical signal delay amount (time) detection circuit 82 in the signal processing circuit 85 detects a delay amount $\Delta t$ between a signal: f(t) generated when a magnetic wall moves from the front side of a critical temperature region of magnetic wall movement, which is formed by the reproducing light beam as an output from the differential amplifier 78, to a maximum temperature point and a signal: k×f(t−Δt) generated when a magnetic wall moves from the back side of the critical temperature region to the maximum temperature point. An amplitude ratio detection circuit 81 detects k as an amplitude ratio of f(t) to k×f(t−Δt). On the basis of the coefficient k as an amplitude ratio and the delay amount Δt, the controller 80 performs a predetermined calculation for the magneto-optical signal and outputs the signal as a reproduction signal. Note that although the optical head and the magnetic modulator described above are also used in the operation to be explained below, these parts will be described later together with the delay amount detection circuit 82 and the amplitude ratio detection circuit 81 with reference to the block diagram in FIG. 4.

A schematic sectional view of the reproducing principle is shown in FIG. 2(a) when reproduction is performed with a temperature profile formed by a normal reproducing beam, without using any heating beam described earlier, in the magneto-optical recording medium 63 of the magneto-optical disk 61, as an object of the present invention.

In this magneto-optical recording medium 63, first, second, and third magnetic layers 11, 12, and 13 are sequentially stacked. Arrows 14 in these layers represent the directions of atomic spins. A magnetic wall 15 is formed in the boundary between regions where the spin directions 14 are opposite to each other. Also, a recording signal recorded in a recording layer of this recording medium is represented as a High-Low waveform below the sectional view. Note that the individual magnetic layers have the characteristics as described previously.

FIG. 2(b) is a graph showing a temperature profile formed in the magneto-optical recording medium of the present invention. This temperature profile is induced on the medium by the reproducing beam spot of a reproducing light beam irradiated for reproduction.

In a position Xs1 on the recording medium, the medium temperature is a temperature Ts near the Curie temperature of the second magnetic layer 12.

In this state, if the gradient of a magnetic wall energy density exists in an X direction, a force acts to move a magnetic wall to a region where the magnetic wall energy is low.

The first magnetic layer 11 has a small magnetic wall coercivity and a large magnetic wall mobility. Therefore, when the first magnetic layer 11 is alone, magnetic walls are easily moved by the force. In a region before the position Xs1, the medium temperature is still lower than Ts, so the first magnetic layer 11 exchange-couples with the third magnetic layer having a large magnetic wall coercivity. Accordingly, magnetic walls in the first magnetic wall 11 are fixed in positions corresponding to the positions of the magnetic walls in the third magnetic layer 13. When the magnetic wall 15 exists in the position Xs1 of the medium as shown in FIG. 2(a), the medium temperature rises to the temperature Ts near the Curie temperature of the second magnetic layer 12, and this breaks the exchange coupling between the first and third magnetic layers 11 and 13. Consequently, as indicated by an arrow 17, the magnetic wall 15 in the first magnetic layer 11 "instantaneously" moves to a region where the temperature is high and the magnetic wall energy density is low, i.e., to a position at which the peak of the medium temperature exists. This similarly happens when the magnetic wall 15 is in a position Xs2; i.e., as indicated by an arrow 18, the magnetic wall 15 "instantaneously" moves, in the opposite direction, to the position at which the peak of the medium temperature exists.

In this state, a signal generated by the movement of the magnetic wall 15 from the front side of the beam and a signal generated by the movement of the magnetic wall 15 from the rear side of the beam appear in the reproducing spot.

This signal reproduction state will be described below with reference to FIG. 3(a) through 3(o).

Referring to these figures, FIGS. 3(a) to 3(l) indicate states in which a reproducing spot 31 moves on an information track 36 on which magnetic domains, indicated by hatched portions, having different recording mark lengths are formed.

FIG. 3(m) shows the waveform having four values of the obtained reproduction signal.

When the reproducing spot 31 is moved relative to the medium in the direction of an arrow 32 while reproduction is performed with a temperature gradient formed by a reproducing beam itself, a region where the temperature is the critical temperature Ts of the second magnetic layer 12 is a Ts isothermal line region 37.

Accordingly, when recording marks and pits are arranged as indicated by hatched portions and blank portions in FIG. 3(a), the temperature of a magnetic wall 34 becomes the critical temperature Ts at the time the front edge of the region 37 whose temperature is the critical temperature Ts of the second magnetic layer 12 comes to the magnetic wall 34. Consequently, the magnetic wall 34 moves in a direction 35 opposite to the direction 32 forward of a peak position 38 of the temperature profile. At this time, the rear edge of the region at the critical temperature Ts of the second magnetic layer 12 is still in the region of a magnetic field in the opposite direction. Therefore, the magnetic wall 34 moves to the peak position 38 of the temperature profile as in the case of the front edge (FIG. 3(b)). In this state, a signal in the direction of magnetization generated by the magnetic wall movement from the front edge of the critical temperature region and a signal in the direction of magnetization generated by the magnetic wall movement from the rear edge of the critical temperature region appear in the reproducing spot. The reproduction signal shows a second level L3 in FIG. 3(m).

When the front edge of the region 37 comes to the next magnetic wall as shown in FIGS. 3(c) and 3(d), the direction of a signal component generated by the magnetic wall movement from the front edge is the same as the direction of a signal component generated by the magnetic wall movement from the rear edge. The reproduction signal shows a fourth level L1 in FIG. 3(m).

Figure 3:
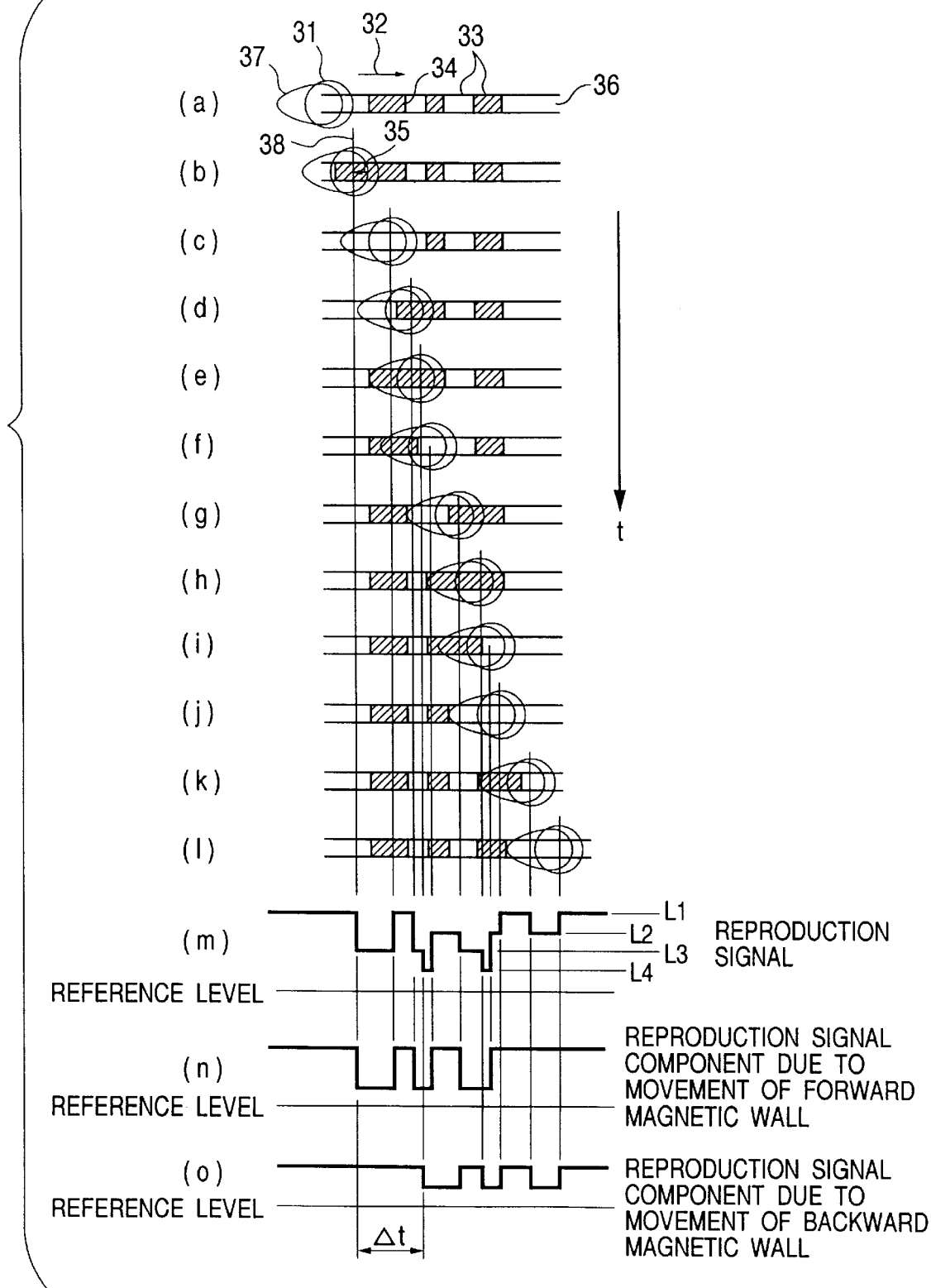
FIGS. 3(a) through 3(b) are views showing changes in a reproducing light spot and a temperature profile and the waveforms of reproduction signals when reproduction is performed with a temperature gradient formed by a reproducing beam, as the basis of the present invention.

In a state shown in (e) of FIG. 3, the direction of magnetization is opposite to that in (c) of FIG. 3, and the reproduction signal shows a first level in (m) of FIG. 3.

When the front edge of the region 37 comes to the next magnetic wall as shown in FIG. 3(f), the reproduction signal component due to the magnetic wall movement from the front side of the light spot becomes opposite. However, since the rear edge of the region 37 is still on the pit in the same direction of magnetization, the signal component due to the magnetic wall movement from the rear side of the light spot remains unchanged. Accordingly, the reproduction signal shows a third level in FIG. 3(m).

When pits as shown in FIG. 3(a) are reproduced by repeating the above operation, the reproduction signal is as shown in FIG. 3(m), i.e., has four levels. In other words, this signal is a synthetic signal of a signal component (FIG. 3(n)) due to the magnetic wall movement from the front edge of the region 37 whose temperature is the critical temperature Ts of the second magnetic layer and a signal component (FIG. 3(o)) due to the magnetic wall movement from the rear edge of the region 37. That is, this reproduction signal is the sum of signals having the same waveform but differences in amplitude and in terms of time.

This is represented by a mathematical expression as follows.

Assuming the reproduction signal is g(t), g(t) is represented by $$g(t)=f(t)+k\times f(t-\Delta t) \quad (1)$$

In this equation, f(t) is a signal reproduced by the movement of the forward magnetic wall shown in FIG. 3(n), $\Delta t$ is the delay time of the reproduction signal corresponding to the relative velocity difference between the light beam and the recording medium, and k is a coefficient indicating the level ratio with respect to the reproduction signal (FIG. 3(n)).

From the foregoing, information recorded on the disk can be obtained by calculating f(t) from the reproduction signal g(t).

A method of calculating f(t) will be described below. A reproduction signal $G(\omega)$ obtained by performing a Fourier transform for equation (1)

$$g(t)=f(t)+k\times f(t-\Delta t)$$

and converting the result into a frequency spectrum is represented as follows.

$$G(\omega)=F(\omega)(1+k\times\exp(-j\omega\Delta t))$$

An original signal $F(\omega)$ obtained by deforming the above equation and converting the result into a frequency spectrum is represented by $$F(\omega)=G(\omega)/(1+k\times\exp(-j\omega\Delta t))$$

By calculating an inverse Fourier transform of $F(\omega)$ in accordance with the following equation, the original signal f(t) on the time base can be obtained.

$$f(t)=\int_{-\infty}^{\infty}F(\omega)\times\exp(j\omega\Delta t)dt$$

In the present invention, after the reproduction signal g(t) is converted into a digital signal by an A/D converter, a digital signal fast processing circuit performs these calculations by using the coefficient k and the delay amount $\Delta t$ previously obtained by measurements. In this manner, f(t) shown in FIG. 3(n) is calculated.

Figure 4:
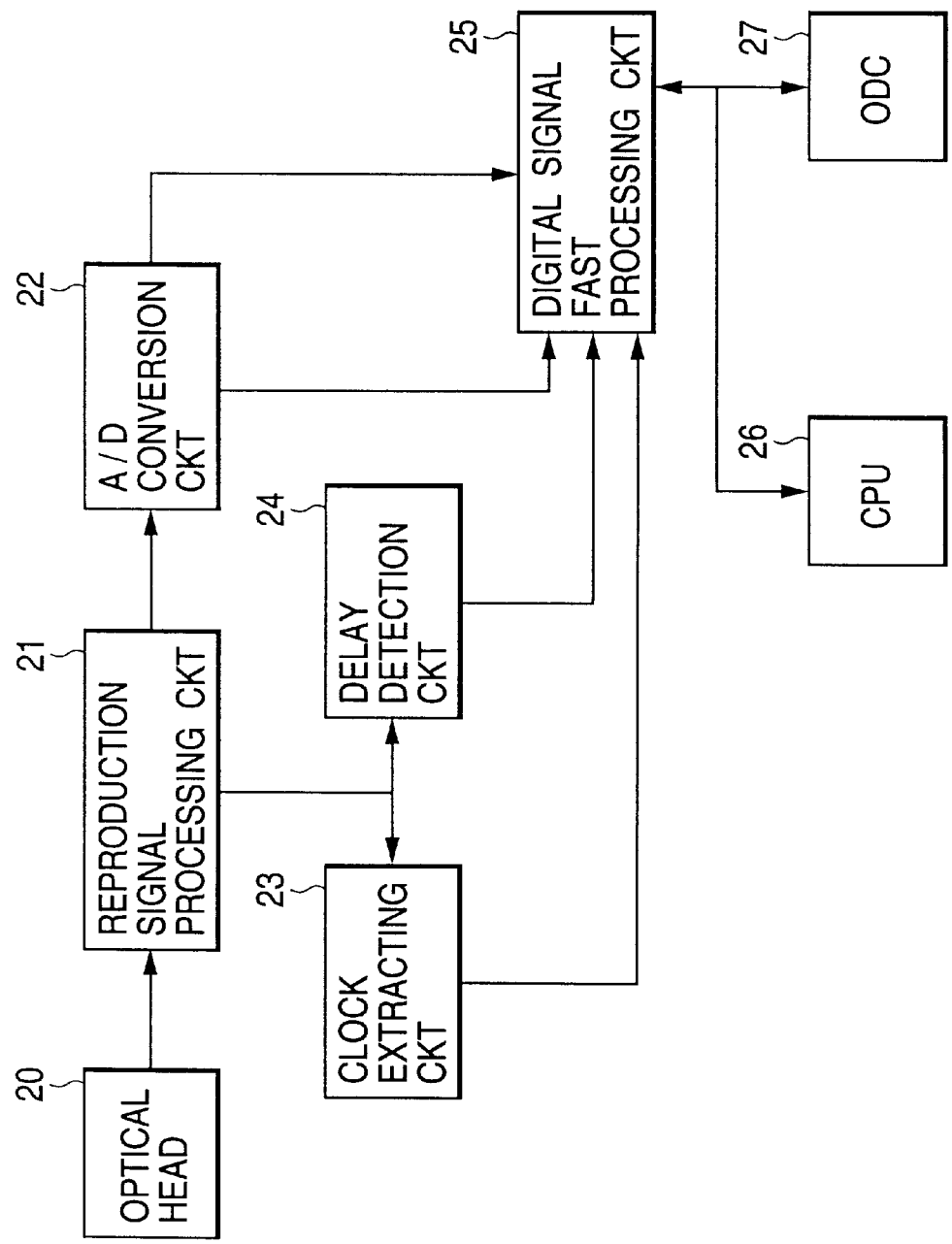
FIG. 4 is a schematic block diagram of a signal processing system of the present invention.

Practical operations and configurations of these parts will be described below. FIG. 4 is a block diagram of a signal input circuit and a signal processing circuit. FIG. 4 is related to processing of a signal reproduced from a recording medium adopting the reproducing method using magnetic wall movement obtained by applying a temperature gradient to a single recording/reproducing laser. An optical head 20 optically reads a reproduction signal and converts the signal into an electrical signal. The reproduction signal converted into an electrical signal by the optical head 20 is shaped into a waveform suited to the subsequent A/D conversion, sync signal reproduction, delay detection, and clock extraction by a reproduction signal processing circuit 21.

An A/D conversion circuit 22 samples the reproduction signal from the reproduction signal processing circuit 21 at a frequency Fs, converts the signal into a digital signal, and supplies the digital signal to a digital signal fast processing circuit 25.

As described above, the digital signal fast processing circuit 25 processes the input digital reproduction signal to obtain $G(\omega)$ by a Fourier transform, $F(\omega)$ by a calculation, and F(t) by an inverse Fourier transform, and supplies the result to a disk controller (ODC: Optical Disk Controller) 27. The operations performed in this circuit are the same as the Fourier transform and inverse Fourier transform done by general digital processing, so a detailed description thereof will be omitted.

A clock extraction circuit 23 extracts a reference clock synchronized with the reproduction signal from the reproduction signal and supplies the clock as a sampling signal to the A/D conversion circuit 22, the digital signal fast processing circuit 25, and the ODC 27.

A delay detection circuit 24 calculates the delay amount (time) $\Delta t$ between a signal component due to the movement of a magnetic wall from the front edge of the region 37 whose temperature is the critical temperature Ts of the second magnetic layer and a signal component due to the movement of a magnetic wall from the rear edge of the region 37 in the reproduction signal. The delay detection circuit 24 transfers the delay amount $\Delta t$ as data to the digital signal fast processing circuit 25.

A CPU 26 controls the operations of the above individual blocks and the data exchange between the blocks.

Methods of detecting the coefficient k and the delay time $\Delta t$ will be described below.

[Method of Calculating Coefficient K]

As shown in FIG. 5(a), recording marks having lengths (L2 and L3) much larger than a length L1 from the front edge to the rear edge of the region 37 whose temperature is the critical temperature Ts of the second magnetic layer and recording marks not meeting this condition are previously formed on a disk. That is, a pattern to be detected is recorded before recording information at the same time recording information for each sector is recorded.

For example, when a data recording area is divided into sectors, this pattern is recorded before information data and a sync signal pattern at the same time the data is recorded. Consequently, the coefficient K and the delay time $\Delta t$ can be calculated for each sector.

When an output signal from this optical head 20 is reproduced, a signal represented by four values as shown in FIG. 5(e), similar to the signal shown in FIG. 3(m), is obtained. In this reproduction signal, four signal levels V1, V2, V3, and V4 appear from the top.

The reproduction signal is a synthetic signal of a reproduction signal due to the movement of a magnetic wall from the front side of a light beam and a reproduction signal due to the movement of a magnetic wall from the rear side of the light beam; i.e., the reproduction signal is the sum of signals having the same waveform and differences in time and amplitude. The following relations hold, assuming that the individual signals are as shown in FIGS. 5(f) and 5(g), the levels of these signals are a, b, c, and d, and the coefficient is K.

$$V1=a+c \quad (1)$$

$$V2=a+d \quad (2)$$

$$V3=b+c \quad (3)$$

$$a-b=K(c-d) \quad (4)$$

From equations (1) and (3), $$a-b=V1-V3$$

$$c-d=V1-V2$$

By substituting these equations into equation (4), $$V1-V3=K(V1-V2)$$

Therefore, $$K=(V1-V3)/(V1-V2)$$

The above calculations are performed prior to reproducing data. That is, on the basis of the digital signal obtained by the A/D converter 22, the digital signal processing circuit 25 or the CPU 26 reads the values of V1 to V4 and calculates the coefficient K.

[Method of Detecting Delay Time Δt]

Figure 6:
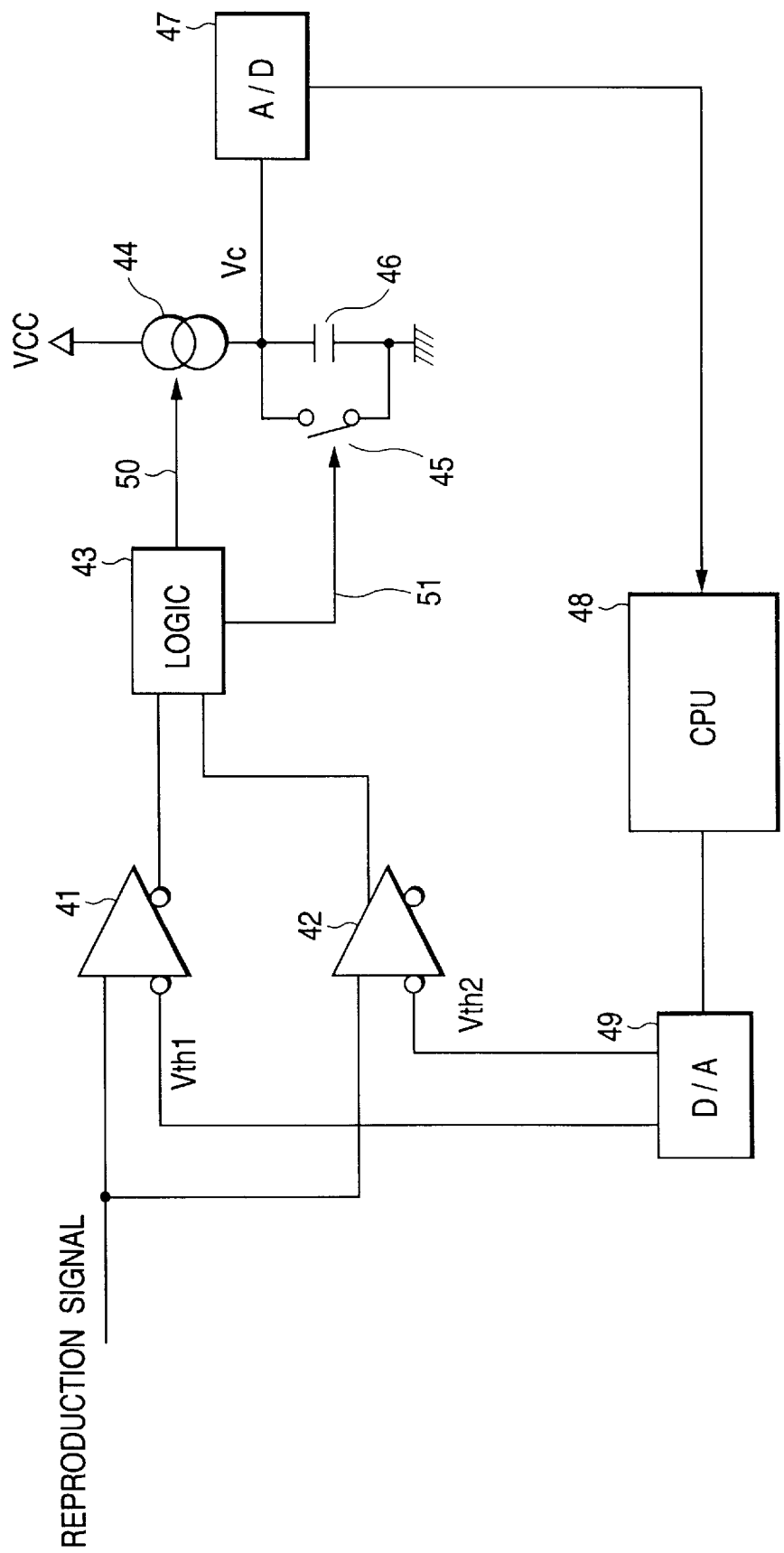
FIG. 6 is a block diagram of a delay detection circuit for detecting a time-wise difference between the reproduction signal generated by movement of a magnetic wall from the front edge of the region 37 at the critical temperature Ts of the second magnetic layer and the reproduction signal generated by movement of a magnetic wall from the rear edge of the region 37.

The operation and configuration of the delay detection circuit 24 will be described below with reference to FIGS. 6 and 7(a) through 7(e). FIG. 6 is a block diagram of the delay detection circuit 24. Referring to FIG. 6, comparators 41 and 42 compare a reproduction signal from the reproduction signal processing circuit 21 with threshold values Vth1 and Vth2, respectively. Assuming the levels of the reproduction signal are V1, V2, V3, and V4, the threshold values Vth1 and Vth2 are set as follows.

$$Vth1=(V1+V2)/2$$

$$Vth2=(V3+V4)/2$$

When a pit similar to the one used in the calculation of the coefficient K is reproduced, the comparators 41 and 42 output signals as indicated by FIG. 7(b) and 7(c). As can be seen from these figures, a time $t_d$ between a change point from V1 to V3 and a change point from V3 to V4 in FIG. 7(a) corresponds to the time difference between the front and rear edges of the temperature profile.

The outputs from the comparators 41 and 42 are input to a logic circuit 43 which generates a pulse signal 50 having a width corresponding to the time difference between a reproduction signal component due to the movement of a magnetic wall from the front edge of the temperature profile and a reproduction signal component due to the movement of a magnetic wall from the rear edge of the temperature profile.

A constant-current source 44 is connected to a capacitor 46 and controlled by the pulse signal 50. That is, the constant-current source 44 is so set as to charge the capacitor 46 while the pulse signal 50 is High.

Also, prior to detecting the delay time Δt, the capacitor 46 is discharged by a switch 45 controlled by a reset signal 51 from the logic circuit 43.

As shown in FIG. 7(d), the capacitor 46 is charged for a time corresponding to the pulse width. As shown in FIG. 7(e), a terminal voltage Vc rises with time and holds the value after the pulse signal falls.

When the capacitor 46 is charged with a current i from the constant-current source 44, a terminal voltage Vc is represented by the following equation.

$$Vc=1/c\int i dt$$

Since the capacitor 46 is charged by a constant current, the current i has a fixed value I, and the terminal voltage Vc is represented by the following equation.

$$VC=1/c I\times t$$

This voltage is proportional to the charging time.

Accordingly, the charging time can be accurately measured by measuring the voltage Vc. From this measured value, the time difference $t_d$, i.e., the delay time Δt between the reproduction signal component due to the movement of a magnetic wall from the front edge of the temperature profile and the reproduction signal component due to the movement of a magnetic wall from the rear edge of the temperature profile can be calculated as follows.

$$t_d = \frac{Vc \times C}{I}$$

where I is the current value of the constant-current source, C is the capacitance of the capacitor, and Vc is the terminal voltage of the capacitor when $t=t_d$.

Information converted into a voltage is converted into digital data by an A/D converter 47 and supplied to a CPU 48 where the digital data is converted into time data.

Fourier transforms, arithmetic operations, and inverse Fourier transforms are performed by using the values of the coefficient K and the time difference Δt thus calculated. Consequently, the signal component due to the movement of a magnetic wall from the rear edge of the temperature profile can be removed from the reproduction signal, so accurate reproduction information can be obtained.

In the above method, the recording pattern for detecting the coefficient K and the time difference Δt is recorded before recording information at the same time the recording information for each sector is recorded. However, the same effect can be obtained when these data are previously recorded on a disk by a soft format method based on magneto-optical recording or a ROM method capable of reproduction by using a magnetic wall movement reproducing method.

Also, in this embodiment, the coefficient K and the time difference $t_d$ are detected by recording a predetermined pattern in each sector. However, if there is a margin in relation to the recording capacity or the recording accuracy, it is unnecessary to record the pattern in each sector. That is, the pattern can be recorded for several sectors or for each zone if a disk is zone-formatted.

In the above description, a signal obtained by the movement of a magnetic wall from the front edge of the temperature profile of a reproducing beam is a necessary reproduction signal. However, calculations can be performed by a similar method even when a signal obtained by the movement of a magnetic wall from the rear edge of the temperature profile of a reproducing beam is a necessary information signal.

In the above embodiment, a magneto-optical disk is taken as an example of a medium. However, the present invention is similarly applicable to a high-density magneto-optical card.

In the present invention, as has been described above, necessary reproduction information is calculated by arithmetic operations from a reproduction signal, upon which a signal component generated by the movement of a magnetic wall from the rear edge of the isothermal line Ts given a temperature gradient by irradiation of a reproducing beam is superposed, on a recording medium. Accordingly, although reproduction is performed by using only a reproducing beam without using any heating beam, it is possible to reproduce a signal recorded with a pit length smaller than an optical diffraction limit and obtain accurate reproduction information. Consequently, a small-sized, low-cost reproducing apparatus can be obtained.

What is claimed is:

1. A signal reproducing apparatus for reproducing a micro mark by causing a magnetic wall to move on a magnetic recording medium, comprising:

heating means for applying a partial temperature profile on said medium, said heating means being adapted to be movable relative to said medium;

reproducing means for generating a first reproduction signal containing both a signal component due to a first magnetic wall movement from a front side of a temperature peak position in the temperature profile toward the temperature peak position and a signal component due to a second magnetic wall movement from a rear side of the temperature peak position toward the temperature peak position, said reproducing means being adapted to be movable relative to said medium; and calculating means for generating a second reproduction signal primarily containing the signal component due to the first magnetic wall movement by an arithmetic operation.

2. An apparatus according to claim 1, wherein said calculating means detects an amplitude ratio of the signal component due to the first magnetic wall movement to the signal component due to the second magnetic wall movement and a delay time between the two signal components, generates a frequency spectral component of the second reproduction signal from the first reproduction signal subjected to a Fourier transform, the amplitude ratio, and the delay time, and generates the second reproduction signal by performing an inverse Fourier transform for the frequency spectral component.

3. An apparatus according to claim 2, wherein said calculating means detects the amplitude ratio and the delay time by reproducing a predetermined detection pattern recorded on said medium.

4. An apparatus according to claim 3, wherein the detection pattern is previously recorded on said medium.

5. An apparatus according to claim 3, wherein the detection pattern is recorded on said medium when information is recorded.

6. An apparatus according to claim 1, wherein said heating means forms the temperature profile by using a light spot.

7. An apparatus according to claim 6, wherein said reproducing means reproduces the first reproduction signal by using a light spot.

8. An apparatus according to claim 7, wherein the light spot of said heating means and the light spot of said reproducing means are the same.

9. An apparatus according to claim 2, wherein the first reproduction signal is expressed by the following equation:

$$g(t)=f(t)+k \times f(t-\Delta t),$$

where $g(t)$ is the first reproduction signal, $f(t)$ is the second reproduction signal, $\Delta t$ is the delay time, and k is a constant determined on the basis of the amplitude ratio, and said calculating means generates the second reproduction signal $f(t)$ by performing an inverse Fourier transform expressed as follows, from a reproduction signal $G(\omega)$ obtained by performing a Fourier transform for the first reproduction signal and converting the result into a frequency spectrum:

$$f(t)=\int_{-\infty}^{\infty} F(\omega) \times \exp(j\omega \Delta t) dt$$

where $$F(\omega)=G(\omega)/(1+k\times\exp(-j\omega\Delta t)).$$

10. An apparatus according to claim 9, wherein said magnetic recording medium comprises first, second and third magnetic layers successively laminated on a substrate, and said first magnetic layer comprises a perpendicular magnetization film having a smaller magnetic wall coercivity and a larger magnetic wall mobility than those of said third magnetic layer at a temperature near environmental temperature, said second magnetic layer comprises a magnetic layer having a Curie temperature lower than those of said first and third magnetic layers, and said third magnetic layer comprises a perpendicular magnetization film.

11. An apparatus according to claim 10, wherein a mark having a length sufficiently greater than a length (L1) defined from a front edge to a rear edge in an area where the temperature reaches a critical temperature (Ts) of said second magnetic layer by said heating means is previously recorded on said magnetic recording medium, and when four signal levels of the first reproduction signal are defined as V1, V2, V3 and V4 from the upper level upon reproduction of the mark, said calculating means detects the signal levels and determines the constant k from the detected level on the basis of the following equation, k=(V1−V3)/(V1−V2).

12. An apparatus according to claim 11, wherein said calculating means detects, from the first reproduction signal upon reproduction of the mark, a time period between a change point from the level V1 to the level V3 and a change point from the level V3 to the level V4 as the delay time ($\Delta t$).

13. An apparatus according to claim 12, wherein said calculating means comprises two comparators, the threshold values ($V_{th1}$ and $V_{th2}$) of which satisfy the following condition, and the delay time ($\Delta t$) is detected on the basis of outputs from said comparators, $$V_{th1}=(V1+V2)/2,$$

and $$V_{th2}=(V3+V4)/2.$$

14. An apparatus according to claim 13, wherein said calculating means comprises a constant-current source, which is controlled by the outputs of said two comparators and a capacitor adapted to be charged by said constant-source, and the delay time ($\Delta t$) is detected from a terminal voltage of said capacitor.

15. An apparatus according to claim 1, wherein the micro mark is recorded over a plurality of sectors on the magnetic recording medium, and said calculating means generates the second reproduction signal for each sector by the arithmetic operation.

16. An apparatus according to claim 1, wherein the magnetic recording medium is divided into a plurality of zones, the micro mark is recorded over the plurality of zones, and said calculating means generates the second reproduction signal for each zone by the arithmetic operation.

* * * * *

UNITED STATES PATENT AND TRADEMARK OFFICE
CERTIFICATE OF CORRECTION

PATENT NO. : 6,084,830
DATED : July 4, 2000
INVENTOR(S) : Takaaki Ashinuma, et al.

Figure 2:
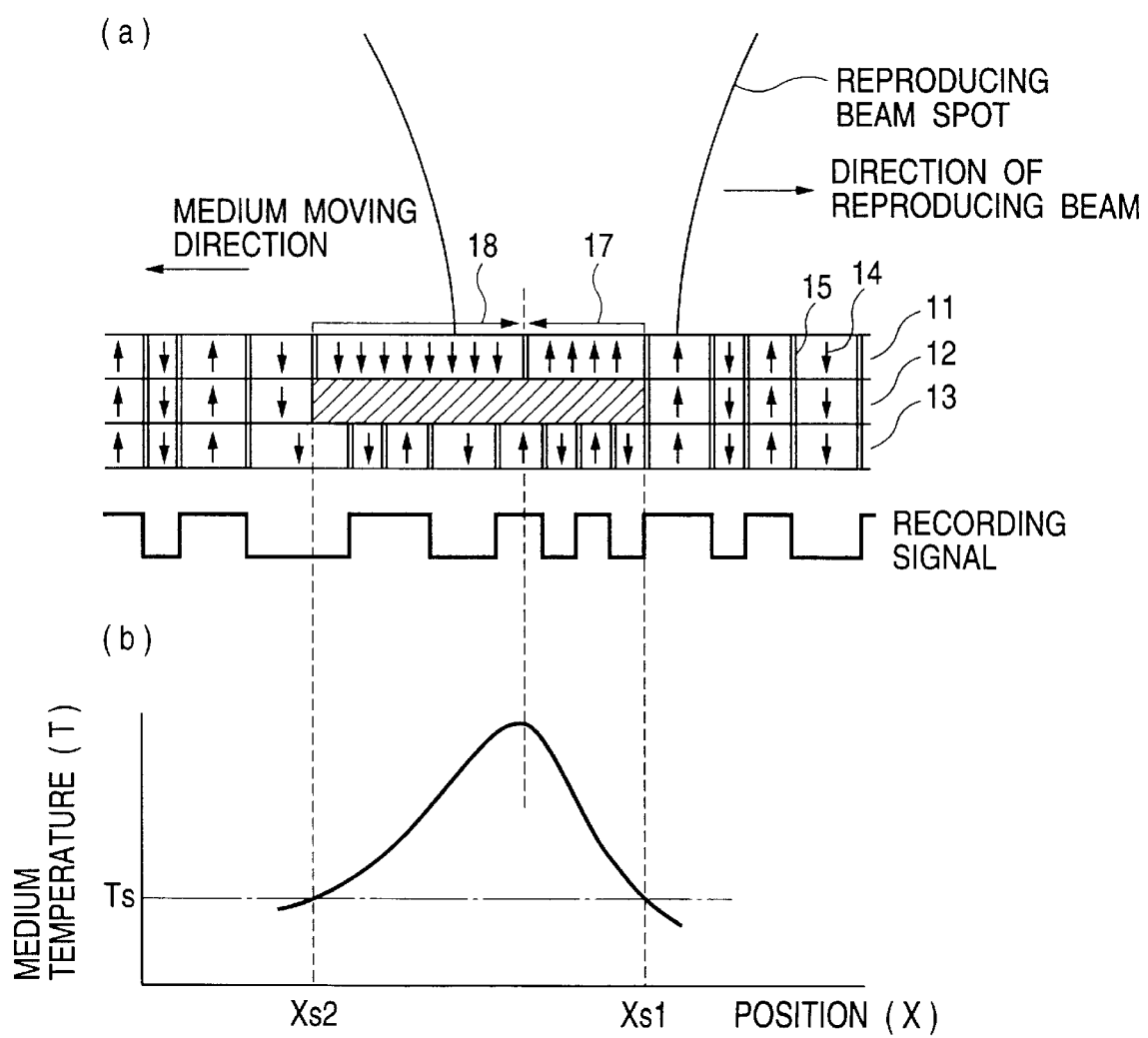
FIGS. 2(a) and 2(b) are views showing the operating principle of the reproducing apparatus to explain the operation of the present invention.

It is certified that error appears in the above-identified patent and that said Letters Patent is hereby corrected as shown below:

Sheet 2,
FIG. 2, replace Fig. 2 with the amended Figs. 2(a) and 2(b) below.

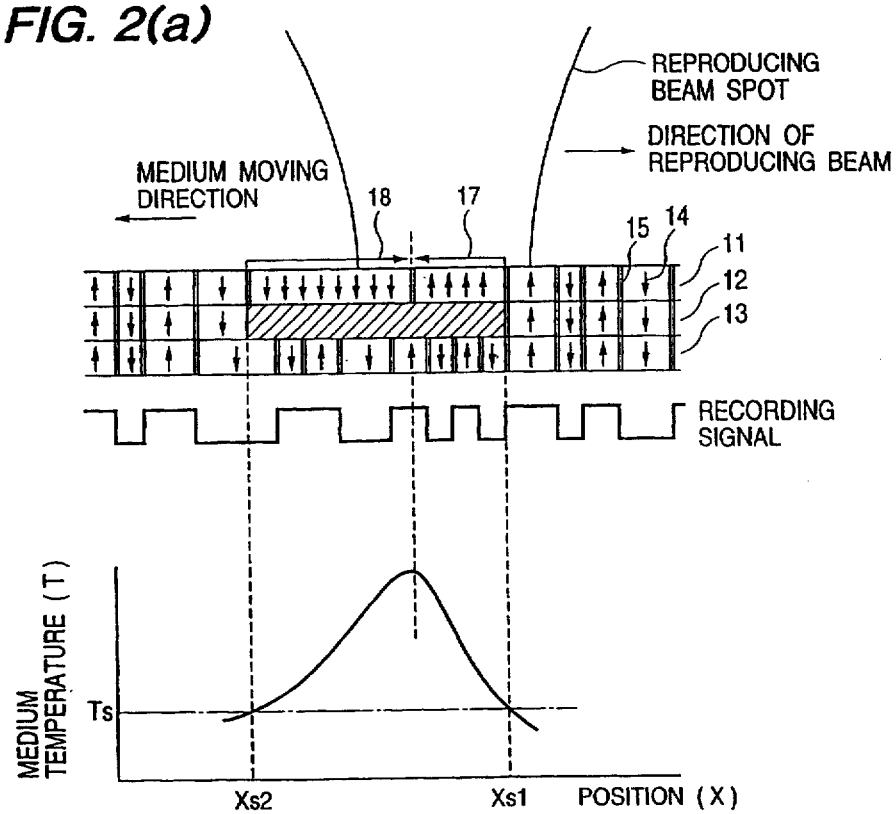

UNITED STATES PATENT AND TRADEMARK OFFICE
CERTIFICATE OF CORRECTION

PATENT NO. : 6,084,830
DATED : July 4, 2000
INVENTOR(S) : Takaaki Ashinuma, et al.

It is certified that error appears in the above-identified patent and that said Letters Patent is hereby corrected as shown below:

Sheet 3,
FIG. 3, replace Fig. 3 with the amended Figs. 3(a) through 3(o) below.

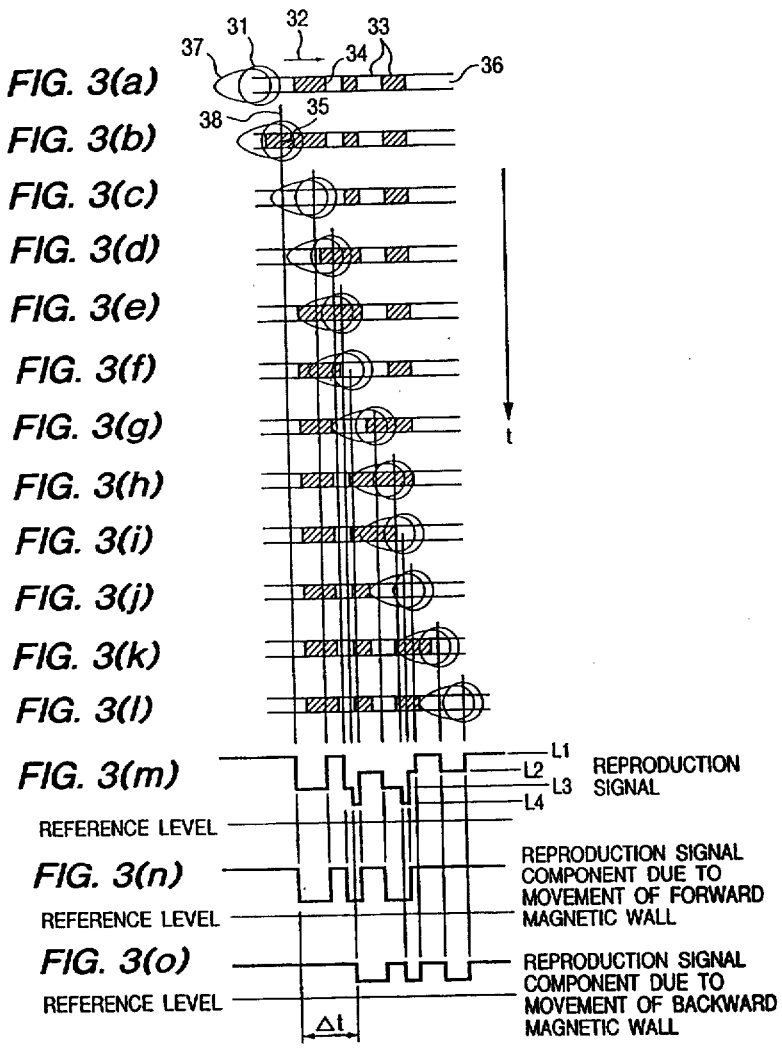

UNITED STATES PATENT AND TRADEMARK OFFICE
CERTIFICATE OF CORRECTION

| | |
|---|---|
| PATENT NO. : 6,084,830 | Page 3 of 5 |
| DATED : July 4, 2000 | |
| INVENTOR(S) : Takaaki Ashinuma, et al. | |

Figure 5:
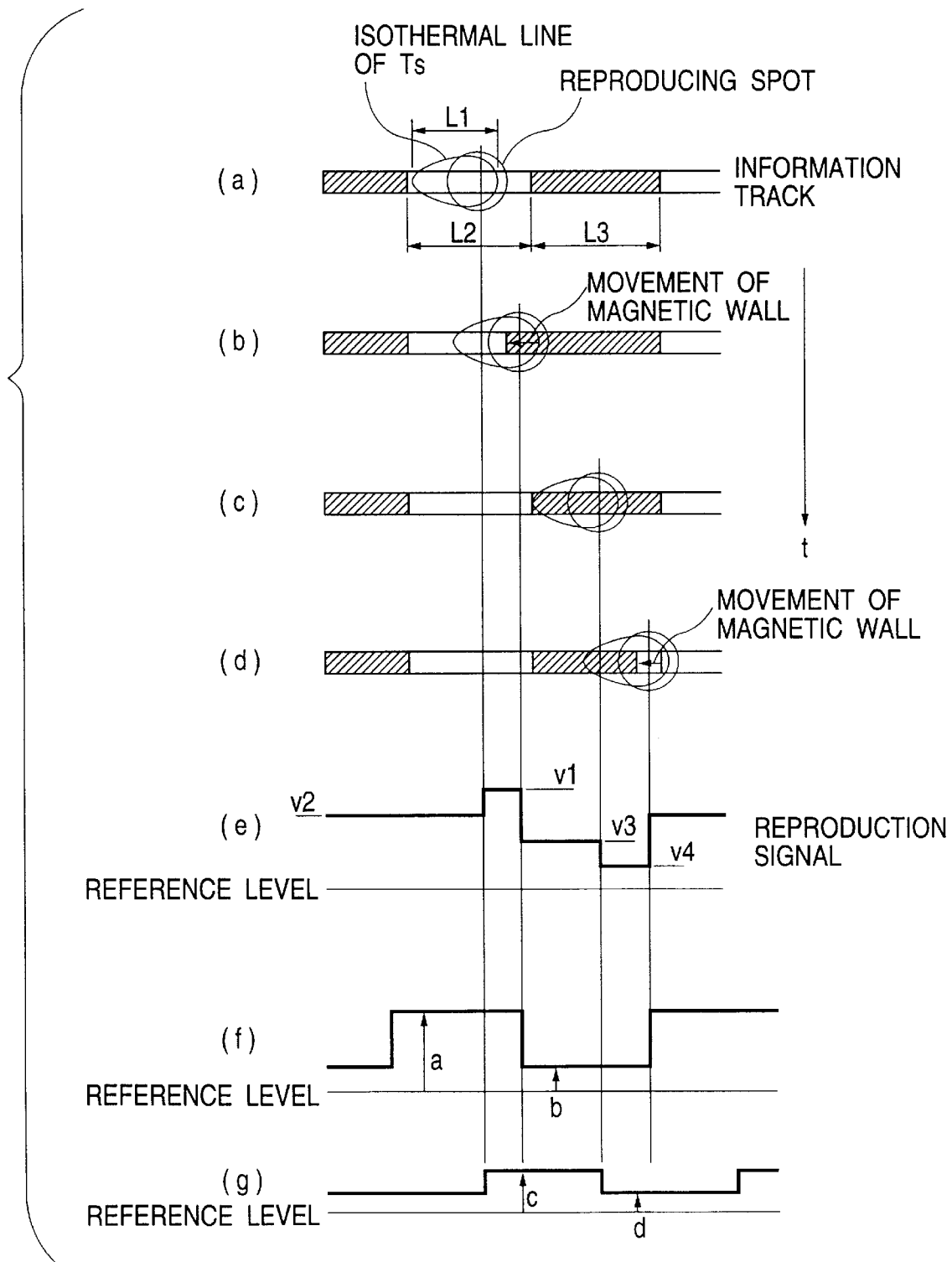
FIGS. 5(a) through 5(g) are views showing a method of detecting a coefficient K, i.e., the ratio of a reproduction signal generated by movement of a magnetic wall from the front edge of a region 37 at a critical temperature Ts of a second magnetic layer to a reproduction signal generated by movement of a magnetic wall from the rear edge of the region 37.

It is certified that error appears in the above-identified patent and that said Letters Patent is hereby corrected as shown below:

Sheet 5,
FIG. 5, replace Fig. 5 with the amended Figs. 5(a) through 5(g) below.

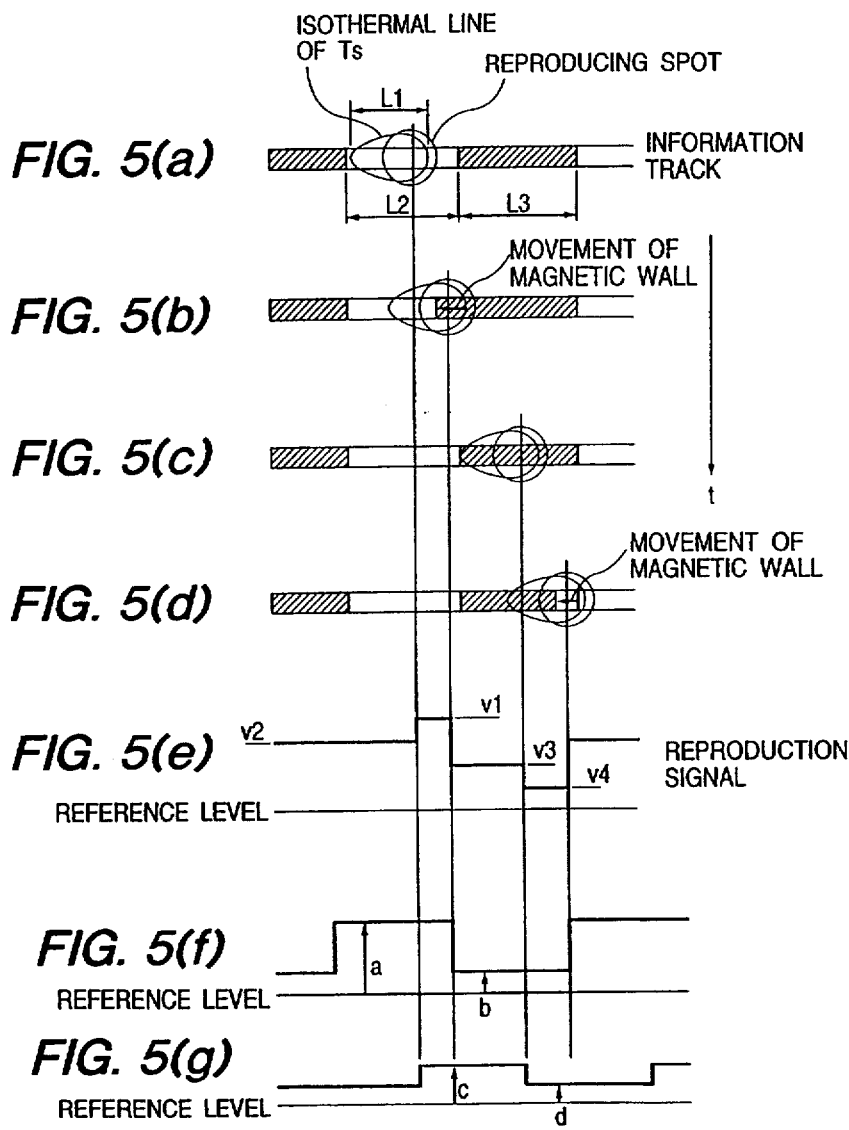

UNITED STATES PATENT AND TRADEMARK OFFICE
CERTIFICATE OF CORRECTION

PATENT NO. : 6,084,830
DATED : July 4, 2000
INVENTOR(S) : Takaaki Ashinuma, et al.

It is certified that error appears in the above-identified patent and that said Letters Patent is hereby corrected as shown below:

Sheet 7,
FIG. 7, replace Fig. 7 with the amended Figs. 7(a) through 7(e) below.

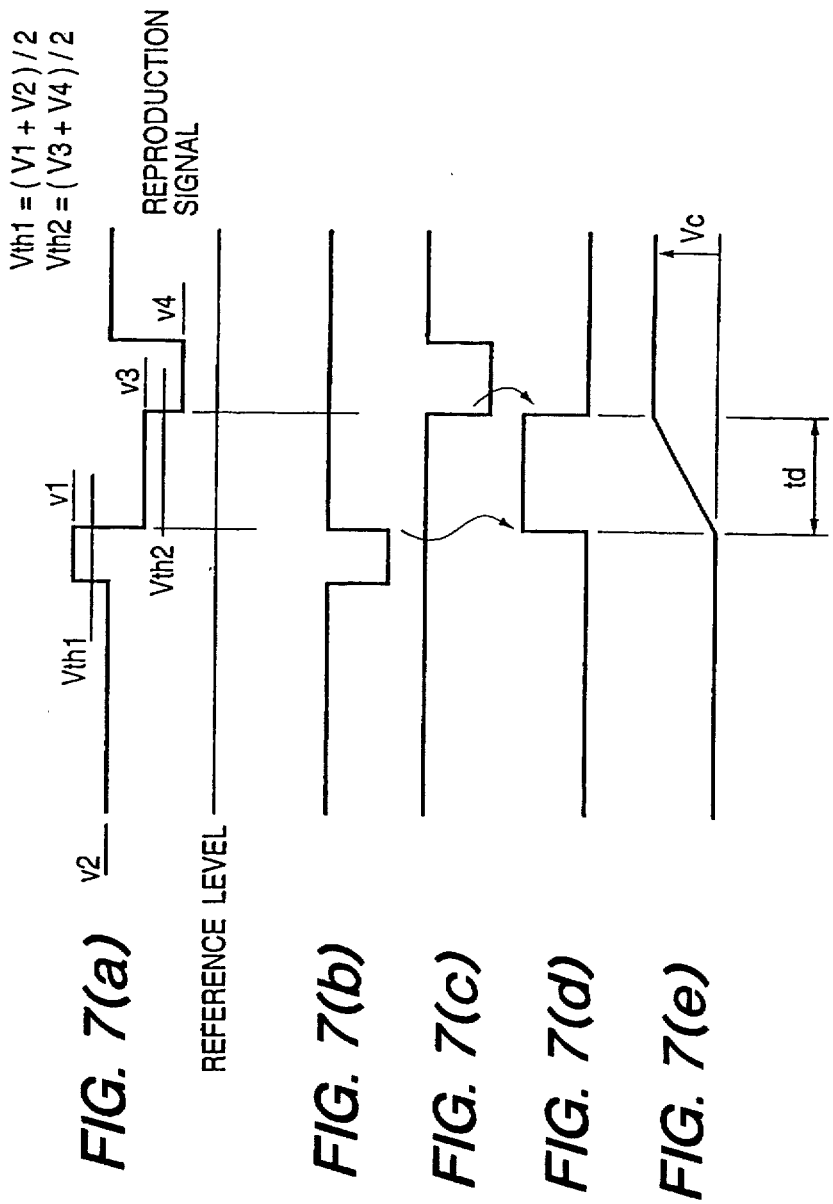

UNITED STATES PATENT AND TRADEMARK OFFICE
CERTIFICATE OF CORRECTION

PATENT NO.   : 6,084,830
DATED        : July 4, 2000
INVENTOR(S)  : Takaaki Ashinuma, et al.

It is certified that error appears in the above-identified patent and that said Letters Patent is hereby corrected as shown below:

Column 2,
Line 35, "FIG. 3 (a) through 3 (c)," should read -- FIGS. 3 (a) through 3(o) --.

Column 3,
Line 22, "FIGS. 3 (a) through 3 (b)", should read -- FIGS. 3 (a) through 3(o), --.
Line 44, "FIG. 7 (a) through 7 (e)", should read -- FIGS. 7 (a) through 7 (e). --.

Column 6,
Line 10, "FIG. 3(a) through 3 (o)." should read -- FIGS. 3 (a) through 3 (o). --.

Column 7,
Line 48, "At" should read -- $\Delta t$ --.

Figure 7:
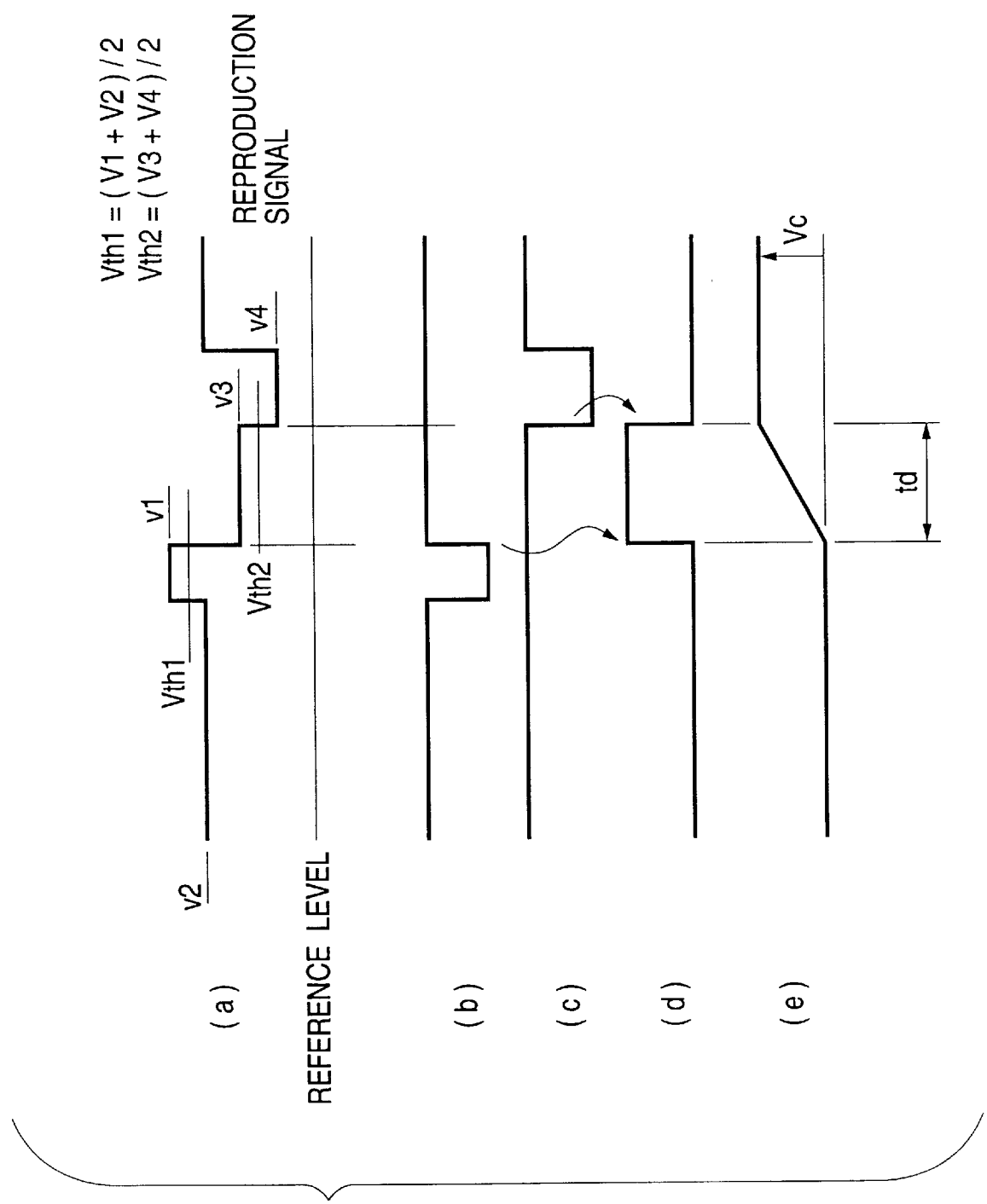
FIG. 7(a) through 7(e) are views showing partial waveforms in a delay detection method of detecting the time-wise difference between the reproduction signal generated by movement of a magnetic wall from the front edge of the region 37 at the critical temperature Ts of the second magnetic layer and the reproduction signal generated by movement of a magnetic wall from the rear edge of the region 37.

Column 9,
Line 29, "FIG. 7 (b) and 7 (c)." should read -- FIGS. 7 (b) and 7 (c). --.

Signed and Sealed this

Twenty-seventh Day of November, 2001

Attest:

*Nicholas P. Godici*

NICHOLAS P. GODICI
*Attesting Officer*  *Acting Director of the United States Patent and Trademark Office*